UNITED STATES PATENT OFFICE.

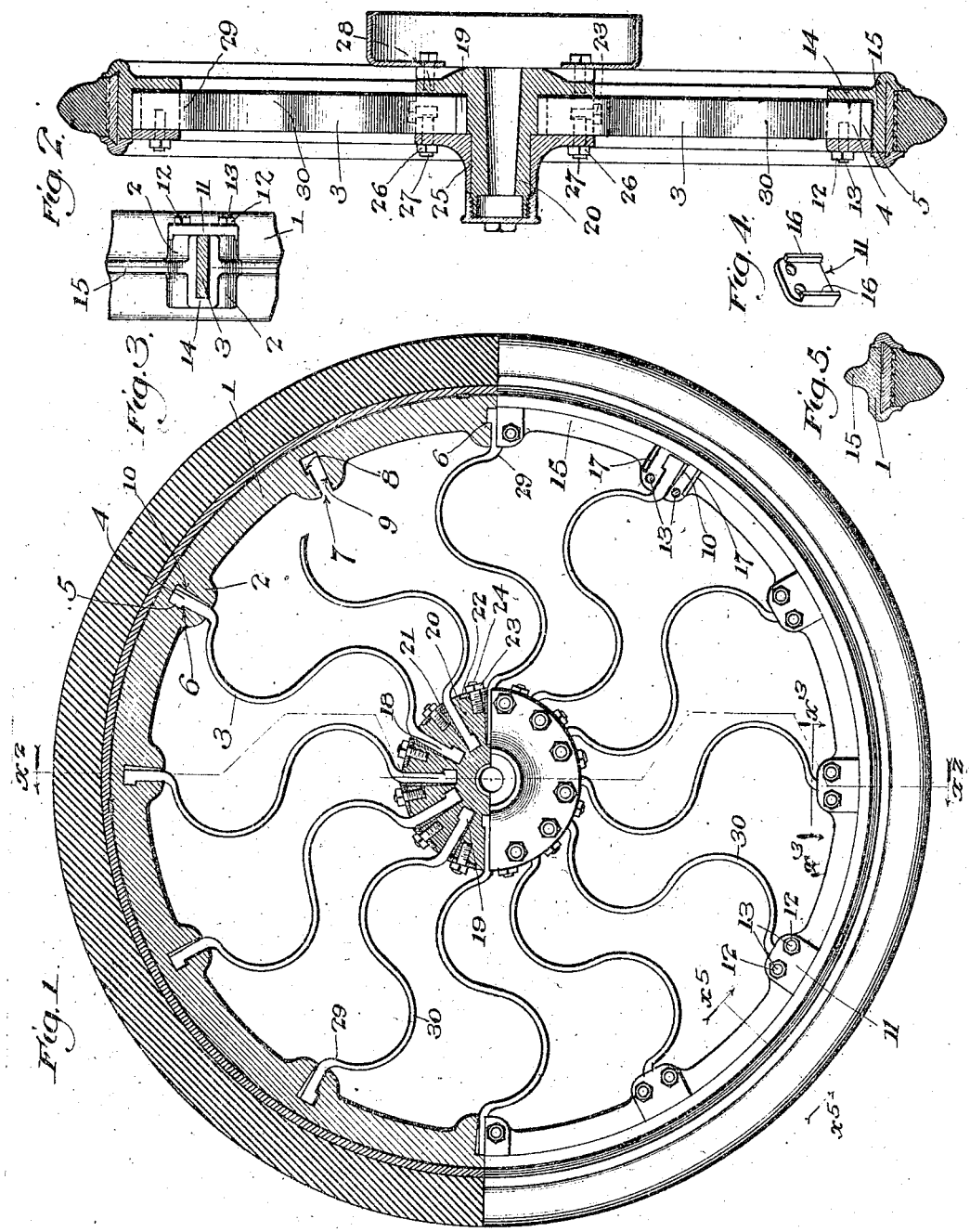

WESLEY E. KEESEE, OF LOS ANGELES, CALIFORNIA.

SPRING-WHEEL.

1,130,740.

Specification of Letters Patent.

Patented Mar. 9, 1915.

Application filed November 6, 1913. Serial No. 799,474.

*To all whom it may concern:*

Be it known that I, WESLEY E. KEESEE, a citizen of the United States, residing at Los Angeles, in the county of Los Angeles and State of California, have invented a new and useful Spring-Wheel, of which the following is a specification.

This invention relates to spring wheels and the object of the invention is to provide an improved fastening for the spring spokes.

Referring to the drawings: Figure 1 is a side elevation partly in section, showing my invention. Fig. 2 is a section on line $x^2$—$x^2$, Fig. 1. Fig. 3 is a section on line $x^3$—$x^3$, Fig. 1. Fig. 4 is a perspective view of a side plate. Fig. 5 is a section on line $x^5$—$x^5$, Fig. 1. Fig. 6 is an enlarged side elevation in detail of the outer end of the spoke.

1 designates the felly which is provided with a series of enlargements 2, which receive the outer ends of spring spokes 3. The outer end of each spoke 3 is provided with an enlarged head 4 having an offset 5 forming a shoulder 6, and the enlargement 2 is provided with a recess 7 having a shoulder 8 which interlocks with the shoulder 6 of the spoke. The recess 7 has an inclined wall 9 and a wedge shaped key 10 is inserted in the recess between the head 4 and fits the inclined wall 9 in such a way as to positively hold the shoulder 6 of the head 4 in engagement with the shoulder 8 of the recess 7, and thereby positively prevent the outer end of the spoke from accidentally becoming disconnected. The key is held against lateral displacement by means of a side retaining plate 11 which is secured by nuts 12 which are screwed to studs 13 embedded in the enlargement of the felly, the other end of the key being held against a flange 14 formed as a part of the felly. The plate 11 has two flanges 16 which are received in rabbets 17 formed in the enlargement 2. This securely holds the retaining plate in the desired position and yet enables it to be quickly removed when it is desired to change a spring spoke, while the key 10 acts primarily to fill the space next to the spoke, and thereby hold the shoulder of the spoke in engagement with the shoulder 8 of the recess, the key can if desired be forced radially away from the rim by first removing retaining plate 11, and then forcing a thin wedge not shown between the end of the key and end of the recess to drive the key tighter.

The inner end of each spoke is formed with an enlarged end 18 with an offset portion 19 similar to the outer end which fits a correspondingly shaped recess in the hub 20. A wedge 21 is inserted back of the enlarged portion 18 to hold it in locked engagement and the wedge is retained in position by a plate 22, the plate 22 being retained by a nut 23 which is screwed on a stud 24.

In a wheel of this character it is very essential that the spokes be securely attached at both ends and the wedging feature which I employ at both ends of the spoke positively locks the spoke in position and yet allows it to be readily removed. In order to retain the wedge 21 a flanged plate 25 is employed which fits on the hub 20 and is retained by nuts 26 screwed to studs 27. The other sides of the wedges are retained by a flange 28 which is formed as a part of the hub 20. Whenever it is desired to remove a spoke, the plate 25 is removed, the nut 23 which holds the plate 22 which retains the wedge 21 associated with the spring to be removed, is unscrewed and the plate 11 at the other end of the spoke is removed, together with the wedge 10 and then the spoke may be slipped sidewise and both its ends disengaged from the hub and felly respectively, after which a new spoke may be readily inserted and the wedges and plates restored. It should be noted that the reinforcement at each end of the spoke is continued around the curve as at 29, see Fig. 6, gradually tapering to the size of the intermediate portion 30 of the spoke. This insures the necessary strength at what would otherwise be a very weak point in the spoke and very liable to breakage were it not thus reinforced. This is a very important feature. The intermediate portion of the spoke by reason of its reduced cross section and the curvature therein provides the desired flexibility and resiliency.

What I claim is:

1. In a spring wheel, a hub provided with a plurality of spoke reeiving recesses, the inner end of each recess being larger than the outer, a plurality of spring spokes, a single spoke fitting in each recess against one wall thereof, the inner end of the spoke being larger than that portion of the spoke at the outer end of the recess, and a wedge tapering radially and adjustable radially in said recess and bearing against the outer wall of the recess, and against the spoke and holding it in engagement with the other wall of the recess, means for adjusting said wedge radially, a felly, and means securing the outer end of the spoke to the felly.

2. In a spring wheel, a hub provided with a spoke receiving recess, the inner end of the recess being larger than the outer, a spring spoke fitting in said recess, the inner end of the spoke being larger than that portion of the spoke at the outer end of the recess, a wedge in said recess removably independent of the spoke and bearing against the spoke and holding it in engagement with the wall of the recess, a felly, means securing the outer end of the spoke to the felly, and a series of plates detachably secured to the periphery of said hub and extending over the respective outer ends of said wedges to detachably retain the wedges in position.

3. In a spring wheel, a hub provided with a spoke receiving recess, the inner end of the recess being larger than the outer, a spring spoke fitting in said recess, the inner end of the spoke being larger than that portion of the spoke at the outer end of the recess, a wedge in said recess bearing against the spoke and holding it in engagement with the wall of the recess, a felly, means securing the outer end of the spoke to the felly, a stud in said hub, the hub being recessed on its outer face, a plate in said recess and projecting over the outer end of the wedge, said stud extending through the plate, and a nut screwed on the stud to hold the plate against the end of the wedge.

4. In a spring wheel, a hub, a felly, a spring spoke with its inner end secured to the hub, the felly having a series of enlargements, each enlargement having a recess formed with a shoulder, the spoke having its end portion formed with a shoulder engaging the shoulder in the recess, a wedge in said recess, bearing against the spoke and holding said shoulders interlocked, said recess opening through the side wall of the enlargement, said enlargement having rabbeted recesses, a plate with flanges fitting said rabbeted recesses and bearing against the side of the spoke and wedge, and studs detachably securing said plate.

In testimony whereof, I have hereunto set my hand at Los Angeles, California this 1st day of November 1913.

WESLEY E. KEESEE.

In presence of—
G. T. HACKLEY,
LORRAINE E. DURROW.